8320X
D. Hubbard,
Making Laths.
Patented July 18, 1834.
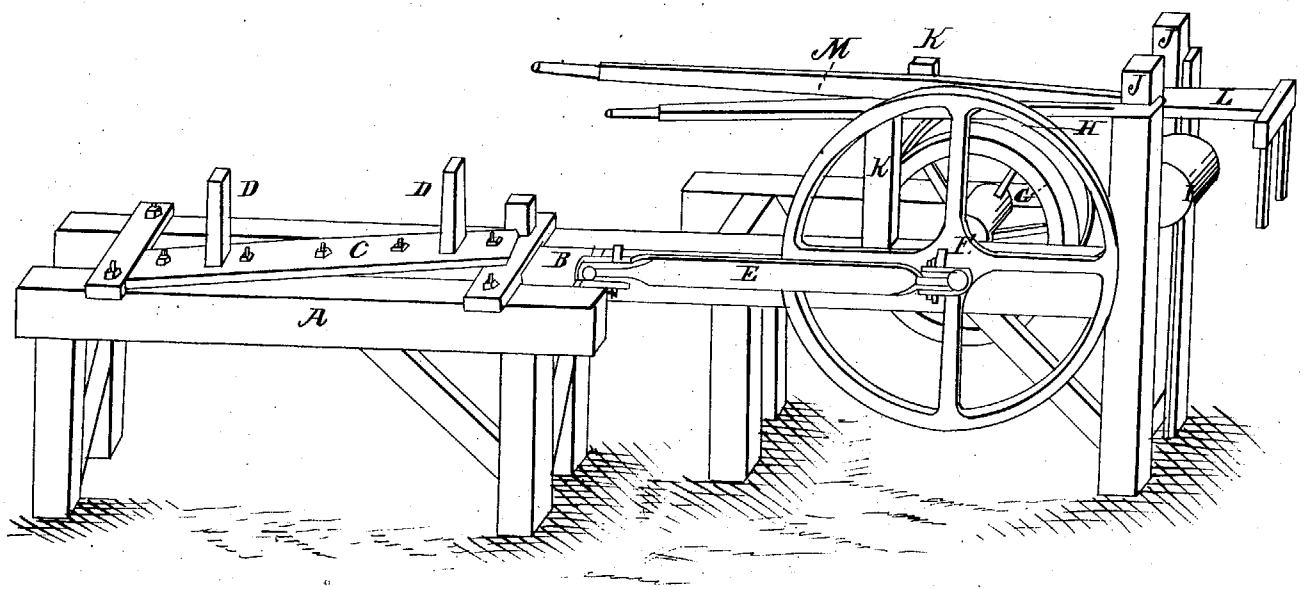
AM. PHOTO-LITHO. CO. N.Y. (OSBORNE'S PROCESS)

July 18.1834

Dana Hubbard. Wheeling Virginia

Letters Patent

The schedule referred to in these Letters Patent and making part of the same containing a description in the words of the said Dana Hubbard him self of his improvement in the machine for cutting Laths for Plasterers uses.

To all whom these Presents shall come,

Be it known that I Dana Hubbard of the Town of Wheeling in the County of Ohio and State of Virginia have invented a new and useful improvement in the machine for cutting Laths for Plasterers uses and that the following is a full and exact description of the construction & operation of the said machine as invented by me — The machine consists of a strong frame or bench made of timber 8 inches square and should be about 8 feet long. from 2 to 3 feet wide & of a convenient height say from 2 to 3 feet. with proper cross braces and stays to stiffen it. The inner edges of the top rails of this frame are to be grooved so as to receive a plank about 3 inches thick of the width of the frame between the grooves, and about a foot shorter than the grooves i.e 7 feet so as to admit of its sliding endwise the distance of 8 or 10 inches. This plank is intended to bear the cutting knife as hereafter described: in its middle and at an angle of about 20 degrees with its edge an oblique mortice or slit is to be cut through the plank of from 2 to 3 inches broad. and about 4 feet 8 inches long or the length of the knife. to one side of this groove, fastened by screws to the upper surface of the Plank is the knife, the blade of which lays over the mortice. The knife may be made wholly or partly of steel properly tempered about 4 to 6 inches broad. and 4 feet 8 inches long. straight edged the whole length of the groove and its edge standing obliquely upward, at a height above the surface of the plank equal to the thickness of the intended Laths; equidistant from the ends of the bench. and so as to contain the length of the Lath between them. two strong timbers are laid across the frame and bolted with screw bolts on the top rails intended for the purpose of holding down the sliding plank above mentioned and to form bearings for the ends of another piece strong piece of timber placed obliquely and secured by bolts to the said cross pieces
so that the face next to the knife coincides with the edge of the knife. at the
ends of its cutting motion. this oblique cross piece is intended to answer the pur
pose of a cutting block and receives the pressure and supports the material from
which the laths are to be cut during the operation - for the better accomplish
ing this purpose two perpendicular arms are morticed into the upper side and
serve to steady the material when broad. the ends of the material being se
cured in two notches or grooves. one of which may be prolonged by an upright
arm or guide corresponding to the width of the intended lath. made in
the aforementioned cross pieces or bearings. this oblique piece is also shod -
with a bar of iron or steel of the thickness of the laths to be made. being secured
to its lower sides by screws and above the upper corner of which the edge of the
knife passes at the end of the cutting motion. and that the latter may lap
a short distance past the edge of the former, the lower corner of the oblique
timber is to be champered before attaching the bar thereto. by this means the
knife passes between them and will make a cleaner cut. To one end of the
sliding plank is attached a pitman to be connected with the crank
of the moving power of the machinery which may be Horse Steam or
water &c. In the machine which I have in use I have found it con
venient to produce that [illegible] of the bench which is nearest to the knife
about 8 feet. and construct on the part so produced. and on the opposite
side a strong frame like that of the bench. across this frame near its centre
I fix the shaft which bears the driving band pulley. and a loose or shifting
pulley in the middle and a balance wheel on the end next the bench to the
4 inch crank. of which latter the pitman is attached. I also raise the
upright posts of the frame farthest from the cutting bench and have a band
tightening roller fixed in a small gate or frame. that works in grooves on
the inner sides of said posts. the gate being raised or lowered by a lever the
end of which rises to the front or feeding point of the machine and
which has its fulcrum on a cross piece supported upon uprights raised from
the frame near the shaft. for further convenience the last mentioned cross piece
has a long groove or slot. through which the end of another lever passes
that has its fulcrum on the top of the gate. and the arm beyond the Gate being fastened so as to seize the band of the driving pulley, the operator by means of it can throw the machine in or out of gear — Operation.
The material is first prepared by sawing it into planks of proper thickness and length to make the intended Laths. and it is then to be placed edgewise upon the sliding plank being supported against the front of the oblique line knife or cutting block. the ends resting in the grooves of the cross pieces into which they pass freely — The machine is then set in revolution, whereby the compound motion occasioned by the sliding of the plank and the oblique position of the knife the lath is partly cut and partly rived from the bottom edge ~~of the bottom edge~~ of the material between the knife and shoe and drops through the groove whereupon the knife draws back. the material falls into its place and the operation is repeated till the material is exhausted, the machine feeding itself after the piece is once laid in.
Although I describe the machine as operating horizontally and have selected 20 degrees as the best obliquity for the knife I reserve the right of varying these and of making it operate vertically, inclined: or otherwise by making the necessary alterations and effecting however the principle here claimed — Now What I claim as new and as my own invention is the oblique position of the knife which together with the sliding of the plank to which it is attached, and the stationary cutting block, produces the compound motion that partly cuts and partly rives the lath from the prepared material with little expense of power — Washington July 16. 1834

Dana Hubbard

Witnesses Robt. Clarke
Saml. W. Marchant

Drawing

Ex'd
C.H.W.

1190 wt

1190

589